United States Patent [19]

Fisher

[11] Patent Number: 4,560,285
[45] Date of Patent: Dec. 24, 1985

[54] MATERIAL BLENDING SYSTEM
[75] Inventor: Glen W. Fisher, Bellevue, Wash.
[73] Assignee: Technovators, Inc., Seattle, Wash.
[21] Appl. No.: 490,352
[22] Filed: May 9, 1983

Related U.S. Application Data

[63] Continuation-in-part of Ser. No. 378,203, May 14, 1982, abandoned.

[51] Int. Cl.⁴ .............................................. B01F 5/24
[52] U.S. Cl. ..................................... 366/341; 366/348
[58] Field of Search ............... 366/341, 348, 136, 137, 366/192

[56] References Cited

U.S. PATENT DOCUMENTS

| | | | |
|---|---|---|---|
| 3,138,369 | 6/1964 | Bennett et al. | 366/136 |
| 3,275,303 | 9/1966 | Goins | 366/137 |
| 3,276,753 | 10/1966 | Solt et al. | 366/136 X |
| 3,317,191 | 5/1967 | Brown et al. | 366/136 |
| 3,361,413 | 1/1968 | Heyl | 366/137 |
| 4,068,828 | 1/1978 | Goins | 366/136 |
| 4,285,602 | 8/1981 | Hagerty et al. | 366/137 X |
| 4,345,842 | 8/1982 | Peschl | 366/137 |
| 4,352,569 | 10/1982 | Krauss | 366/341 X |
| 4,353,652 | 10/1982 | Young | 366/341 X |
| 4,408,889 | 10/1983 | Peschl | 366/341 X |

FOREIGN PATENT DOCUMENTS

530738 7/1955 Italy ................................. 366/341

Primary Examiner—Philip R. Coe
Assistant Examiner—Frankie L. Stinson
Attorney, Agent, or Firm—Dowrey & Cross

[57] ABSTRACT

A blending bin for particulate having a plurality of vertically extending passageways is provided. Each passageway includes multiple vertically spaced ports. Blending vanes are provided within each passageway to control the proportion of material withdrawn from the bin through the ports. The streams of material are in turn proportionally combined into a single outlet stream. The ports are spaced such that lots of material loaded into the bin will be blended together in the outlet stream and such that thin layers of off-grade or non-uniform material will not reach disproportionate levels in the outlet stream.

13 Claims, 6 Drawing Figures

MATERIAL BLENDING SYSTEM

CROSS REFERENCE TO RELATED APPLICATIONS

This is a continuation in part of U.S. patent application Ser. No. 378,203, filed May 14, 1982 and now abandoned.

FIELD OF THE INVENTION

This invention relates to a system for blending particulate material and a blending bin for such material. More particularly, it is directed to a method and apparatus for withdrawing material from a storage bin so as to homogenize the material and disperse localized differences in the quality or concentration of the material. As such, the method and apparatus may be used with mixtures of materials and with materials which vary in quality, purity or other critical parameter.

BACKGROUND OF THE INVENTION

Solid particulate material bins can be categorized as process bins and storage bins. Process bins are employed in continuous or batch type processes and hold material, typicaly, for relatively short time periods of operation of the process. Storage bins are employed to hold material for relatively longer time periods, and frequently are not directly involved in a process other than to supply material to or receive material from the processing apparatus. Storage bins are usually considerably larger than process bins and, in the case of grains and other raw materials, may have a capacity measured in railcar loads.

Two types of physical segregation occur in both storage and process bins that can degrade the quality of the final product or cause difficulties in the processing of the material. The first of these types of secregation results from the non-uniform witdrawal of the material from the bin. In the case of a hopper-bottom bin with a single centrally located outlet for the material, the fine fractions thereof tend to concentrate toward the center and the coarse fractions concentrate near the walls. As a result, even if the material was homogenous when loaded into the bin, the process of withdrawing it can concentrate the different fractions of materials such that the consistency of the material varies as it is withdrawn from the bin.

This form of segregation can be reduced or eliminated by use of the system for controlling such segregation described in the inventor's U.S. Pat. No. 4,030,633. The solid particulate material blender described in the inventor's U.S. Pat. No. 3,571,321 may also be used to combat this form of segregation.

The second type of segregation that tends to occur in bulk material handling is that caused by non-uniformity in the input material. In the chemical industry, such variations in consistency may be the result of differences in the purity, dryness, or partical size of batches loaded sequentially into the hopper. In the grain industry, the moisture, protein and screenings content of the grain frequently varies from carload to carload. Layers or phases of segregated, nonuniform material thus are frequently created in bulk material by virtue of its serial loading into the bin. The two types of segregation generally result in the output of a nonuniform product from the bin.

In the grain milling industry, such nonuniformity of the grain which results from this segregation is particularly critical. If the millability of the grain changes as it is withdrawn from the bin, the milling equipment must be constantly adjusted to compensate for such changes. This increases the labor and expense of milling the grain. If the milling equipment is not properly monitored, the flour produced can be of uneven quality which can in turn affect the quality of goods made therewith. The problems caused by non-uniformity between lots of material in a bin may be aggravated if the material is withdrawn such that there is an abrupt transition between withdrawal of material from a first lot and withdrawal from a second lot. In the case of wheat, such a transition may result in an abrupt change in protein or moisture content of wheat in the stream of material withdrawn from the bin.

In order to mitigate the problems associated with nonuniformity of grain, many mills have instituted "master mix" programs to blend and mix the grain prior to milling. Such programs are generally expensive, however, as they require considerable handling of the grain and require considerable excess storage capacity. A "master mix" program might be implemented as follows.

Grain from five sources is first matched to yield desired protein quality and quantity. The grain is simultaneously drawn from the five sources and loaded sequentially into three silos. The grain is then simultaneously withdrawn from these three silos and again sequentially loaded into three additional silos. This process of simultaneous unloading and sequential loading is again repeated, after which the grain is drawn off simultaneously once more and loaded sequentially into three silos until the first silo is completely full and the second is half full. At this point, grain is drawn simultaneously from the first and second silos and transported to the mill for processing. The third silo is filled as the first and second silos are emptied. When the second silo has been emptied, grain is withdrawn from the first and third silos simultaneously.

As is apparent from the above description, "master mix" programs result in dilution of localized nonuniformities in the grain finally delivered to the mill and attempt to deal with the problem of aggregation of material by density and size. Such programs thus improve the uniformity of the grain delivered to the mill and thereby decrease the need for attention to the milling machinery.

In the plastics industry, plastic materials are frequently furnished to processors in particulate form. It is also important in this industry that the material withdrawn from bins for processing be uniform in nature and that levels of impurities be maintained below a predetermined maximum value. In addition, small quantities of off-grade material are occasionally salvaged by mixing them with material which has a lower concentration of impurities than the maximum acceptable value. This off-grade material may be loaded into a bin to form a thin layer or spike. It is thus common to blend the plastic material prior to processing to ensure that it is of the desired homogeneity. Such mixing is frequently accomplished by recirculating the material through a blending device. This mixing of course, is expensive in terms of energy usage, manpower and equipment.

BRIEF DESCRIPTION OF THE INVENTION

Although the present invention may be used in any industry in which uniform consistency of materials or mixtures of materials is desired, it will be described herein with respect to the handling of grain by flour mills.

The present invention relates to a material blending bin and method of blending flowable particulate materials or mixtures or increase the uniformity thereof. This blending bin and method are particularly suited for use with continuous processes and are unlike batch process mixing methods and apparatus wherein quantities of materials must be repeatedly drawn off for mixing and processing, emptying the bin each time.

The inventor has discovered that, under the proper conditions, material may be simultaneously withdrawn from a bin at a plurality of port locations adjacent the walls and bottom of the bin while maintaining laminar mass flow of the material as described below. These ports may advantageously be arranged in spiral tiers. In such case, the ports of each tier may be angularly spaced about the wall of the bin in a spiral configuration. The ports may also be of non-spiral configuration where avoidance of spiral loading of the bin is desired. The ports of successively lower tiers may be aligned vertically with corresponding ports in the uppermost tier and a vertical passageway provided to carry grain from each such set of vertically aligned ports. In order to provide for the uniform withdrawal of material from the bin in the proper proportions, the flow of grain through each port in the passageway is controlled and apportioned.

As each layer of material moves downward in the bin past succeeding tiers of ports it becomes thinner. Accordingly, the vertical spacing between the ports in successive tiers should be reduced from that of the first tier to account for the thinning of the layers.

The inventor has discovered that withdrawing material from the bin at such a plurality of ports adjacent the wall and bottom of the bin can, when properly controlled, result in substantially laminar flow of the material through the bin. If this material is recombined by a discharge control means which properly proportions the amount of material withdrawn at each port and recombines the material withdrawn into a single stream, both segregation due to density differences in the material and segregation caused by layering can be significantly reduced. In this regard, the inventor has discovered that material may be withdrawn from a layer or phase within the bin as it passes a port. Under proper conditions, as described below, the material so removed from the layer results in the layer becoming thinner. This is caused by the lateral drift of the particles in the layer. Although such a shift, which may be accompanied by funneling of the layer adjacent the port, results in a slight departure from strict laminar flow, such laminar flow is restored in the material as soon as it passes the port. The small amount of material withdrawn from the layer as it passes the port is recombined with material from the other ports in controlled proportions such that the stream of grain removed from the hopper is thoroughly blended.

As the layer passes each port and becomes progressively thinner, its downward velocity also decreases. This is due to the fact that the amount of material being removed at a point in the bin below the layer decreases as the number of ports remaining below the layer decreases. The lowest and hence thinnest layer therefore travels downward at the slowest speed. As a result, the discharge of material from any given layer is spread uniformly over a greater period of time, and differences in consistency among the layers are thus diluted to insignificant levels.

It has also been found that funneling in the vicinity of the ports distorts the shape of successive layers of material within the bin. Such distortion may result in fluctuations in the consistency of the stream of material withdrawn from the bin such that the desired quality standards are not met. For example, when a thin layer of off-grade material approaches the first port, it may be drawn into the port along a funneling path which extends the vertical height of the material. This thin layer of off-grade material may be drawn from almost exclusively by the first port for a brief period. The proportion of this off-grade material which appears in the outlet stream may thus be sufficiently high to exceed a desired maximum level in the outlet stream for brief periods. As a result, it has been found desirable to withdraw a relatively lesser proportion of material through the first one or two tiers of ports than is drawn through succeeding tiers.

The funneling occurring in the vicinity of these lower ports extends the funneling of the material which resulted from the action of the ports of the upper tier or tiers. At the same time, material in these funnels withdrawn from the thin layer is diluted by material from other layers of material such that abrupt changes in the uniformity of the material in the outlet stream from the bin are minimized. Succeeding ports can then withdraw relatively greater quantities of material without exceeding the set proportion from a spike layer in the outlet stream.

By choosing the proper spacing between ports and tiers of ports, successive lots may be simultaneously blended together. Simultaneously therewith, small layers of non-uniform material, also referred to as spikes, may be integrated into the outlet stream of material such that the material in the outlet stream does not exceed a desired maximum proportion.

A storage area may be provided in the bin above the level of the ports. Besides providing storage economy and reducing the need to constantly refill the bin during processing, this storage area provides a significant head of material above the ports which may aid in stabilizing funneling of the material therethrough and therefore also aids in the maintenance of laminar mass flow of the material within the bin.

DETAILED DESCRIPTION OF THE PREFERRED EMBODIMENT

In brief, the material blending system of the preferred embodiment of the present invention comprises a blending bin, a plurality of gravity discharge passageways, each having a plurality of inlets for blending particulate materials as they are withdrawn from a blending zone of the blending bin, and discharge control means for withdrawing material from the discharge passageways and from the bottom of the blending zone in predetermined proportions.

Although the present invention may be used in any industry in which a homogeneous particulate material or mixture of such materials is desired, such as the pharmaceuticals, plastics, chemical and food products industries, the invention is here described without limitation in connection with the blending of grain from storage bins in the flour milling industry.

Figures 1, 2, 3:
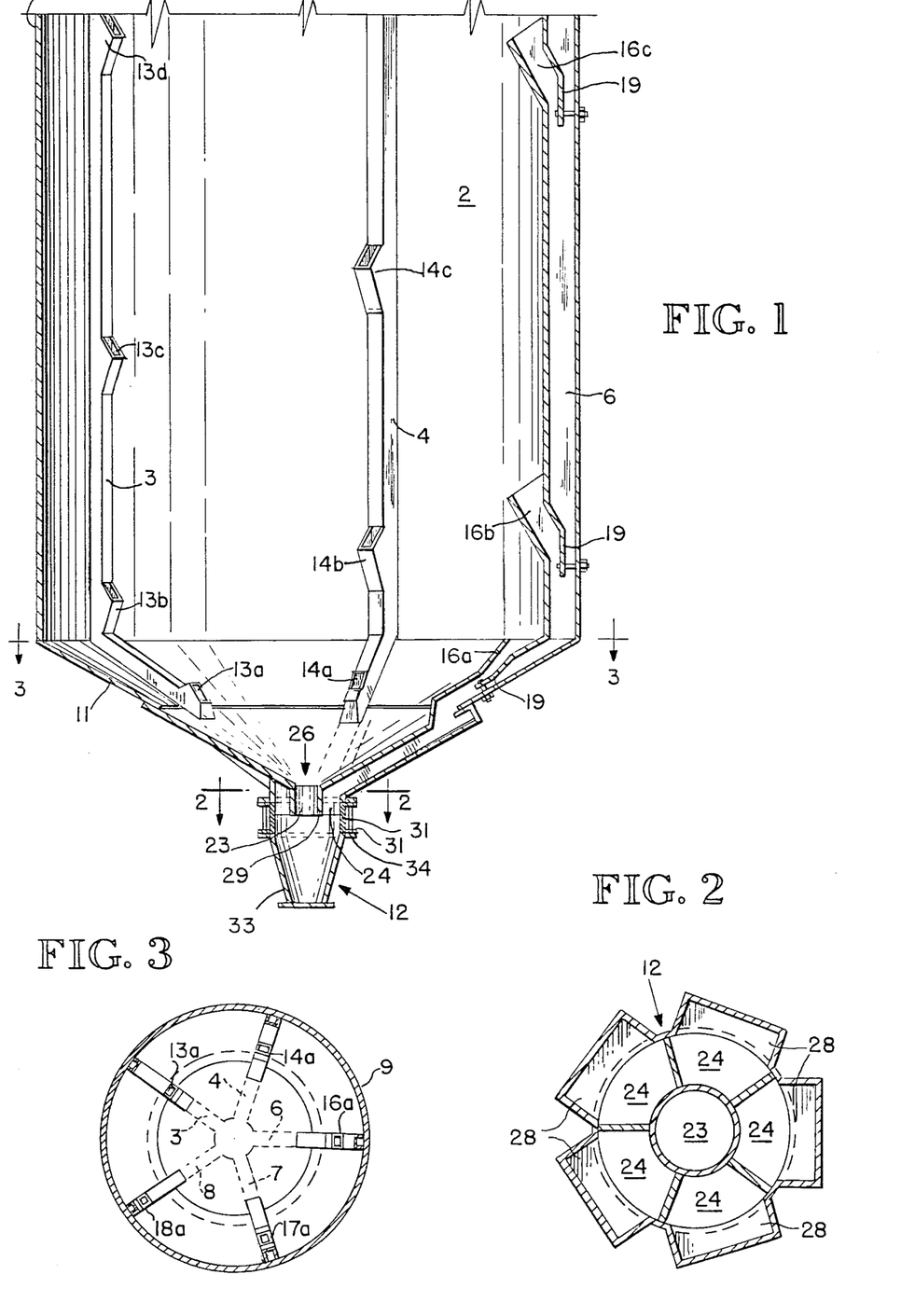
FIG. 1 is a cross-section view of the blending zone of a blending bin according to the present invention.
FIG. 2 is a cross-section view of the blending bin of FIG. 1 taken along line 2—2.
FIG. 3 is a cross-sectional view of the blending bin of FIG. 1 taken along line 3—3.
Figure 6:
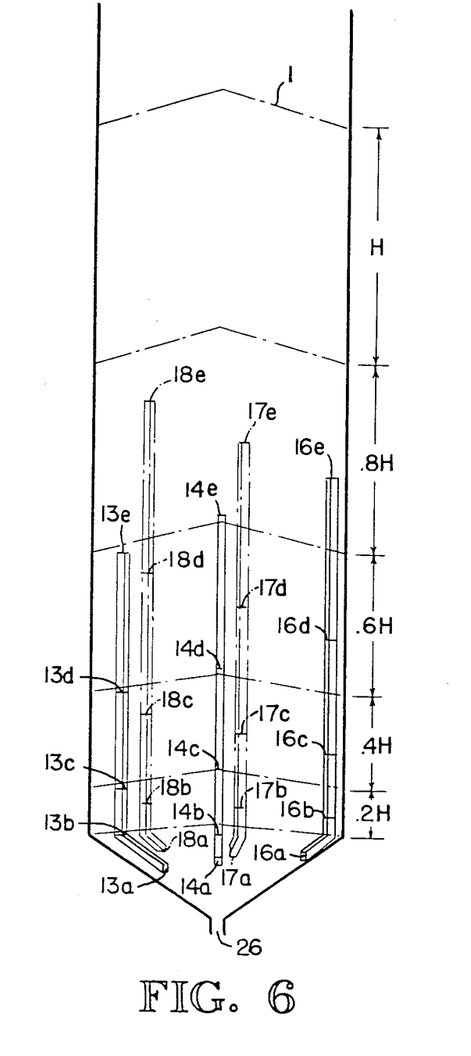
FIG. 6 is a schematic representation of a bin according to the present invention illustrating the narrowing of layers as they move downwardly through the blending zone.

As illustrated in FIGS. 1, 3 and 6, the bin of the preferred embodiment includes a storage zone 1 and a blending zone 2. A plurality of gravity discharge passageways 3, 4, 6, 7 and 8 are located in and define the blending zone 2 of the bin. These discharge passageways are connected to the wall 9 and hopper 11 of the bin and converge at the bottom of the hopper to discharge grain into a discharge control means 12, best shown in FIGS. 2 and 4.

Figure 5:
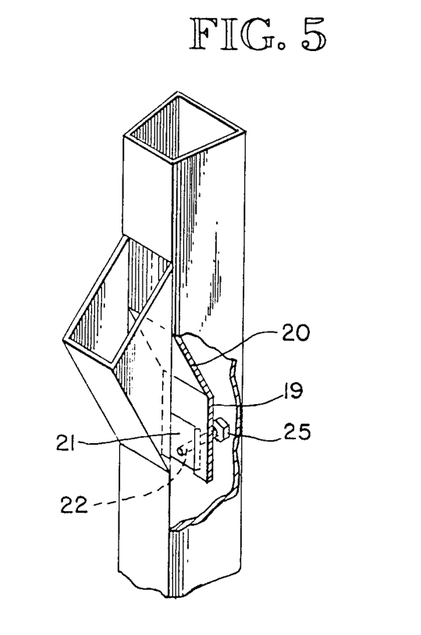
FIG. 5 is a perspective view of a wall port according to the present invention with the parts broken away.

As shown in FIG. 5, the discharge passageways 3, 4, 5, 7 and 8 may be of trapezoidal cross-section and may be formed by bending a sheet of material and attaching it to the wall 9 of the bin in any of a variety of known manners. As shown in FIGS. 1 and 3, the five discharge passageways 3, 4, 6, 7 and 8 may be radially spaced about the bin at regular intervals from one another. Each passageway 3, 4, 6, 7 and 8 may includes five ports (13a, 13b, 13c, 13d and 13e; 14a, 14b, 14c, 14d and 14e; et seq) spaced along its length for simultaneously admitting grain thereto. These ports may be spaced inwardly from the bin wall 9 such that the center of the port is defined by the midpoint of one side of the largest pentagon which can be inscribed within circular cross-section of the bin. Such spacing of these ports into the interior of the bin aids in the controlling of funneling and maintenance of laminar mass flow of the material in the bin.

Laminar mass flow occurs when material of sufficient depth moves downwardly in a bin of uniform cross-sectional configuration as such material is removed from the bottom of the bin. The rate of downward movement must be such that the particles remain in contact with one another. Under such conditions, the particles in a horizontal cross-section or layer of the bin which are subject to laminar mass flow all move downwardly at the same rate and maintain their co-planar relationship. Particles in the hopper also move in mass flow if the rate at which the material is withdrawn does not cause them to fall out of contact with one another. This mass flow is not laminar, however, because of the tapered hopper geometry.

Each tier of ports (i.e., 13a, 14a, 15a, 17a, and 18a; 13b, 14b, 15b, 17b, and 18b; et seq) defines a blending phase. The ports within each tier are spaced apart elevationally in a spiral fashion. The present embodiment provides five discharge passageways with each tier of ports (13a et seq; 13b et seq; 13c et seq; 13d et seq; 13e et seq;) containing five ports. This embodiment provides five stages of blending. The uppermost tier (13e, 14e, 16e, 17e and 18e) will come into communication with the layers of material first as the layers progress down through the blending zone. As illustrated, each tier of ports in this embodiment is designed to remove an equal amount of material from the material layers as the layers progress downwardly.

The overall width of the tiers of ports may advantageously be varied according to the amount of material removed from a layer or phase of material by tiers of ports located at higher elevations in the bin. Thus, as shown schematically in FIG. 6, a layer of material may have a height H prior to any material being withdrawn therefrom. Since in the present example each tier of ports is designed to remove 20% of the material in each layer, the distance from the uppermost port 18e of the first tier to the uppermost port 18d of the second tier may be chosen as 0.8H to account for the material removed by the first tier. The spacings between the highest port in succeeding tiers might be chosen as 0.6H, 0.4H and 0.2H, respectively.

If the five ports in each tier are uniformly spaced, as in the present example, the distance between the uppermost port in the highest tier and the lowermost port in that tier would be 0.8 times 0.8H or 0.64H. The succeeding tiers would have spacings of 0.48H, 0.32H and 0.16H. If it is desired to leave space between successive tiers of ports for processing or other reason, the spacing of the tiers could be preserved as above. The spacing between the highest ports in each tier would, of course, vary from the above described percentages of H. If more or fewer tiers of ports are used, the thickness of each tier would be reduced accordingly.

The ports may be spaced vertically within the tier by equal amounts or may be otherwise spaced depending on the desired results. The ports may be proportionally spaced within a tier, for example, in accordance with the amount of material removed by succeedingly higher ports in like manner to the reduction in thickness of succeedingly lower tiers.

It will be appreciated, of course, that in certain instances there may be no well defined phase or layer within the material. In such case, the width of the tiers may be chosen according to the amount of material withdrawn from the bin in a given time period. The spacing of the various ports and tiers of ports could then be based on the thickness of a layer of such material as described above. Likewise the total number of ports and tiers may be varied according to the desired results.

In general, the height of each tier of ports is determined according to the thickness of a layer or phase of material. Each tier of ports is designed to remove material from the bin in predetermined proportions. In any given instance, that may be more or less than 20% per set.

As shown in FIGS. 1 and 5, each port includes a blending vane 19 which divides the passageway into two flow channels, one communicating with its associated port and the other communicating with the passageway above that port. The uppermost port does not require a blending vane. The discharge control means 12, inter alia, regulates the withdrawal of material from the bin through the passageways such that material flowing through the passageways is in mass flow. In the absence of the blending vanes, material flow through the passageways would also be in laminar flow, but material would not enter any ports until the material overhead in the respective passageways cleared that port. By extending the lower edge of the blending vanes a predetermined distance below their respective ports and dividing the passageways into two flow channels, it has been discovered that material will enter each port in proportion to the relative passageway cross-sectional area at the blending vane lower edge, and that the material flowing from the blending vane lower edge will be in laminar flow. Consequently, by proper positioning of the blending vane, the desired proportion of material overhead in the passageway can be blended with material entering the respective port.

The length of each blending vane and the location of the lower edge of each blending vane must be sufficient to meet two criteria. First any particle-to-particle turbulence within the material as it passes through the respective port must have sufficient distance to settle out so that the influence of laminar flow conditions below the blending vane lower edge can be effected. Secondly, any particle-to-particle turbulence within the material flowing through the passageway from above the respective port that is caused by the presence of the blending vane division of the passageway into two flow channels must likewise have sufficient distance to settle out. The satisfaction of these two criteria may be determine empirically.

As shown in FIG. 5, the blending vane 19 includes a flap 21 cut therefrom which may be flexed to control the flow of grain by means of a bolt 22 connected thereto which extends through the bin wall 9. A nut 25 is threaded onto the bolt 21 externally to the bin to adjust the angular position of the flap 21.

The flow of grain through the five passageways 3, 4, 6, 7 and 8 is in turn controlled by the discharge control means 12. As shown in FIGS. 1 and 3, the passageways 3, 4, 6, 7 and 8 exit the hopper bottom 11 at points approximately half way to its center and feed into the top of the discharge control means 12.

Figure 4:
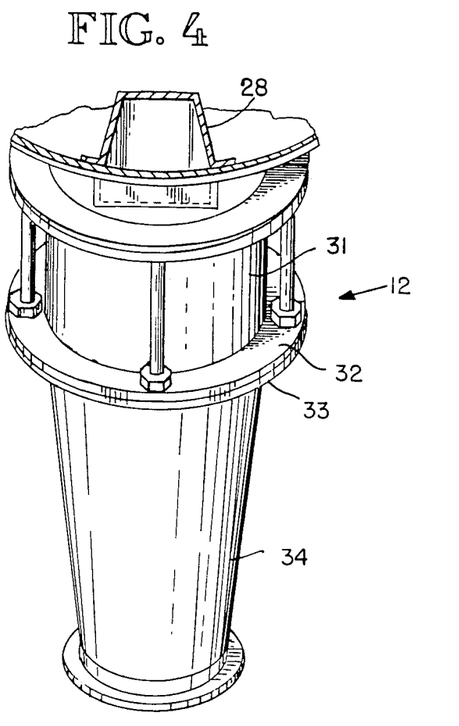
FIG. 4 is a perspective view of a discharge control means for controlling withdrawal of material from the bin of FIG. 1 with parts broken away.

FIGS. 1, 2 and 4 illustrate the details of the discharge control means 12. This blending device is attached to the passageways 3, 4, 6, 7 and 8 and conical hopper bottom 11.

The segregated compartments of the blending device, best shown in FIG. 2, are arranged as one axial compartment 23 and five peripheral compartments 24. The axial compartment opens to provide a central port 26 in the bottom of the hopper, and each peripheral compartment 24 opens to the associated discharge passageways 3, 4, 6, 7 and 8 through a radical spouting section 28. The bottom edges of the segregated compartments 23, 24 are located at the same elevation within the blending tube 12 and define the laminar mass flow plane 29 therein. Below this plane, a conduit 31 of constant cross-sectional geometry extends downward for a sufficient distance as hereinafter described in order to give rise to laminar mass flow of the grain at the blending plane. The conduit 31 terminals in a flange 32. A conical outfeed section 33, having the same cross-sectional geometry at its upper end, it is connected to the bottom of the conduit 31. This conical section 33 includes a flange 34 at its upper end which corresponds to the flange 32 of the conduit 31. The conical section 33 may thus be removably mounted to the conduit 31 by bolts extending through the flanges 32, 34.

As shown in FIG. 4, the conical section 33 has a low taper rate. Although laminar mass flow will not occur in this tapered section, the low taper rate does allow a symmetrical mass flow of grain which reduces the length of constant cross-sectional conduit 31 needed to maintain laminar mass flow at the plane 29. The passageways 3, 4, 6, 7 and 8 of the present embodiment simultaneously withdraw proportioned quantities of material through all of the ports therealong by virtue of their configuration. As described above, the lower ports 13, 14, 16 and 17 include blending vanes 19 for proportioning the amount of grain admitted therethrough relative to the total flow of grain below the vane. This proportioning is only effective, however, if the grain in the plane perpendicular to the vane is in laminar mass flow. This laminar mass flow condition can be created by constructing the passageway with a sufficiently long section of constant cross-sectional dimension. The length of this section required to establish laminar mass flow at the lower edge of the blending vane can be determined experimentally by constructing a passageway having the desired cross-sectional configuration. The lower end of the tube is closed off and the tube is filled with particulate material to be blended. A segment of the blocked end of the passageway is then opened to permit the flow of the material, and the flow of material is monitored. The point above the lower end of the tube at which the particles vertically above the opening begin to gravitate downward more rapidly than other particles in the same cross-section is the critical point. If the passageway of constant cross-sectional configuration below the blending vane is of a length greater than the distance from the bottom of the trail passageway to the critical point, the flow of material immediately below the blending vane will be laminar mass flow. Since by definition, under laminar mass flow condition, all the particles in a layer move vertically at the same speed, the ratio of material flowing past the end of the blending vane on either side thereof will remain constant. The ratio of material entering the passageway through any port is thus determined by the ratio of the cross-sectional area of the passageway in front of the blending vane 19 to the total cross-sectional area of the passageway. Since adjustment of the position of the flap 21 alters this ratio at the mass flow plane immediately below the vane 19, the proportion of grain admitted through the port to the total amount of grain passed through the passageway can be adjusted to the optimum level.

Likewise the conduit 31 below the lower end of the axial and peripheral compartments 23, 24 of the blending tube is of sufficient length that the flow of grain at the lower terminus of the compartments 23, 24 is also laminar such that equal amounts of grain are withdrawn from the five passageways. The ratio of material drawn through the axial compartment to the total amount of material withdrawn from the bin is likewise constant. In practice it has been found desirable that the ratio of the quantity of material withdrawn from the bottom of the bin to that withdrawn through the wall ports be approximately 20:80 in order to prevent stagnation of flow, formation of a dome of slow-moving material in the center of the bin, and disruption or distortion of the laminar flow of the material. Tests have demonstrated, however, that satisfactory results can be obtained with ratios as low as 10:90. It should be noted that a greater or lesser number of passageways and ports may be used as long as the ratio of material withdrawn through the wall ports to the total amount of material withdrawn does not deviate excessively from these ratios to the point at which excessive stagnation or turbulence within the material develops.

The discussion heretofore has been in regard to bins in which the grain is loaded through a port located in the center of the top thereof and withdrawn from a symmetrical, conical hopper bottom. In such case, the layers of grain are loaded into the bin so as to form dome-shaped layers which are symmetrical about the center axis of the bin. If the grain is loaded from the side of the bin, it will form layers in a plane which is less than 90° relative to the axis of the bin. In such case, the relative heights of the ports can be adjusted such that the material is drawn therethrough such that the uniformity of blending is not impaired. Similarly, the present invention may be practiced in bins with planar inclined bottoms wherein the material is withdrawn at a location adjacent the side wall by arranging the lower ports along the bin bottom so as to maintain laminar mass flow within the bin to the greatest extent possible.

The blending device 12 may also be replaced by mechanical metering means within the scope of the invention. Separate metering devices such as constant velocity augers could be used to effect the combining of the streams of grain from the passageways 3, 4, 6, 7 and 8 and central port 26.

In use the bin is first loaded with the material to be blended, and material is withdrawn therefrom through the blending device 12. As shown schematically in FIG. 6, as the material reaches the blending zone small amounts thereof are withdrawn from each layer or phase through the ports 13, 14, 16, 17 and 18. The material is withdrawn through the ports at a predetermined, proportioned rate. Thus, as each layer of material passes a port, a percentage of that layer is removed through the port. When the material in the bin is moving downward in laminar mass flow, the layers become progressively thinner as they approach the bottom of the bin. Since material is constantly being withdrawn from ports situated above such a thinned layer, its downward velocity is also reduced with each succeeding port passed until it reaches the hopper bottom.

In practice, a bin of sufficiently large size to supply milling apparatus for thirty-six hours may be loaded with a suitable blend of grain. During the milling process the bin may be periodically refilled as the grain is withdrawn. As shown in FIG. 6, the blending zone is approximately one-third the total height of the bin and therefore contains enough grain for twelve hours of milling. As each layer of grain passes the ports, however, its volume is reduced at a constant rate from its original thickness until it has been completely removed from the bin at the bottom. The average thickness of each such layer as it moves toward the bottom of the bin is thus one-half of its original thickness and the average speed at which it moves toward the bottom of the bin is likewise one-half the speed at which it was moving downward when it entered the blending zone. Thus, during operation, a layer of grain entering the blending zone 2 of the bill will require twenty-four hours to pass completely through the blending zone 2 so that any nonuniformity of the grain will be spread over the twenty-four hour blending period.

The thinning of the layers is accompanied by movement of the particles in the layer toward the port through which material is being drawn. Thus there is some lateral movement of material within a layer each time such layer passes a port. In practice it has been found that the use of three or more passageways, and hence three or more ports per tier, encourages lateral drift of material sufficiently to develop a thinning reaction within the layers of material. Between the ports, laminar flow of the material is restored. Thus macroscopic laminar flow characteristics are sustained throughout the blending zone.

Likewise some funneling occurs as the layer approaches a port, but testing has shown that this funneling is minimal and localized and that laminar flow is quickly reestablished after the layer passes the port.

These results derive from the proportioning effects of the blending vanes 19 in the passageways 3, 4, 6, 7 and 8 and the blending device 12 which unites the passageways. Normally, a single vertical passageway with a plurality of ports will not withdraw material through all of the ports simultaneously. Rather, such a tube will first admit material primarily through the highest port and will begin to admit material through the next highest port only when the level of material within the bin is drawn down to the level of the upper port. Since the blending vanes 19 cause grain to be admitted at all ports 13, 14, 16, 17 and 18 simultaneously, however, and since the flow of grain through the passageways is maintained at a predetermined ratio by the blending device 12, material withdrawn from all areas of the blending zone is united in a single, well proportioned stream.

The blending provided by the bin of the present invention is superior to that provided by use of a master mix program and is achieved with a lesser expenditure of capital and manpower. In a master mix program, as hereinbefore described, the grain is drawn from five silos and loaded into three, withdrawn therefrom simultaneously and so forth. As a result, the uniformity of the grain is input in five streams and divided or blended by transferring it among silos by a factor of 18. This yields a blending factor of 90, corresponding to 1.11%. By contrast, a single silo according to the present invention would receive the same five streams of grain. By withdrawing the grain proportionally through the twenty-five ports 13$a$, 13$b$, 13$c$, 13$d$, 13$e$, 14$a$, 14$b$, 14$c$, 14$d$, 14$e$, et seq, spaced throughout the blending zone 2, however, and proportionally recombining this grain into a single stream, a blending factor of 125 is achieved, corresponding to 0.80%, Thus, the largest concentration of grain from a single one of the original five sources is unlikely to reach 0.80%. An increase in the number of tiers of ports and ports per tier will, of course, result in even more complete blending. The present example, of course, has not even considered the segregation of materials in the silos according to density which is compounded by the extensive transferring of the grain among silos in the practice of a master mix program.

Blending among lots and blending of the thin layers of non-uniform material, also referred to as spikes, can be accomplished simultaneously by adjusting the quantity of material drawn through each port, the spacing between ports within each tier and the spacing between tiers. Blending of spike layers presents a difficult problem. The inventor has discovered that the upper tier of ports draw a higher proportion of material from a spike layer over a much shorter duration of time than do ports of succeedingly lower tiers. As a result, if the first tier ports withdraw as much material as do ports of succeeding tiers, the concentration of spike layer material in the outlet stream will reach a higher maximum value and the material will be withdrawn over a shorter period of time than would be the case for a port in a lower tier. This successive increase in duration of withdrawal of material from a spike layer and reduction of the maximum concentration results from funneling of the material in the vicinity of the ports which vertically extends the spike layer.

The spike layer is deformed by the funneling as it approaches the level of the first tier of ports. Succeeding tiers of ports also give rise to funneling within the particulate material and further distort the spike layer by extending the vertical funneling. During the funneling process, however, the material of the spike layer is diluted with particulate material from the layers above and below with the result that the lower extremity of the funnel contains only minor portions of material drawn from the spike layer. The funneling caused by the first tier of ports is thus of a primary significance in controlling the composition of the output material notwithstanding the presence of a layer of non-uniform or off-grade material.

In order to accomplish the blending of spikes such that the maximum amount of spike material which appears in the outlet stream of the bin is controlled, the first tier of ports should therefore withdraw a lesser quantity of the material than ports in succeedingly lower tiers. The lower tiers may withdraw increasingly greater quantities of material because the funnelling adjacent the ports of the upper tiers has preconditioned the shape of the spike layer to reduce the maximum concentration of spike layer material withdrawn through the lower port and increase the time span over which such material enters the outlet stream.

Thus, in a model bin having four ports per tier, five tiers of ports and one centerline port at the hopper bottom, the proportions of material withdrawn through each port as a percentage of the outlet stream of material were selected as follows:

TABLE I

| Tier | Proportion Withdrawn by Each Port | Proportion Withdrawn by Tier |
|---|---|---|
| 1 | 2.5% | 10 |
| 2 | 4% | 16 |
| 3 | 5.55% | 22.2 |
| 4 | 5.55% | 22.2 |
| 5 | 5.55% | 22.2 |
| Centerline Port | 7.4% | 7.4% |
|  |  | 100% |

As set forth in Table I the amount of material withdrawn by the uppermost tier, Tier 1, is less than half of that withdrawn by the lowermost three tiers.

In addition to this preconditioning, it is also important that the vertical spacing of ports within a tier and the spacing between the tiers be properly chosen. Since the concentration of material withdrawn from a spike layer through port rises to a maximum level and then declines as the layer moves downward past the port, ports within each tier should be spaced vertically by an amount sufficient to stagger the times at which each port is withdrawing material from the spike layer at its maximum rate. If all ports in a tier reached their maximum rates of withdrawal of material from the spike layer simultaneously, of course, the percentage of material in the outlet stream would reach a maximum level equal to the sum of the maximum levels being withdrawn through each port. This would be highly undesirable since the material of the spike layer might exceed a desired level in the outlet stream.

In addition, since funneling of material in a spike layer causes a vertical extension of the layer, the distance between tiers must be sufficient so that such funneling does not cause ports of one tier to be withdrawing material from the layer until after ports from a preceeding tier have begun to draw material from the spike layer and have passed their maximum rates of withdrawal of such material. Thus, in the bin referred to in connection with Table I, the last port of the first tier was spaced above the first port of the second tier by an amount equal to the distance between successive ports in the tier plus the depth of the funnels created by the ports of the first tier. Since the effective depth of the funnel remains essentially constant because of the dilution and thinning of the funnel extremity as the spike layer passes successive ports, this first tier funnel depth is useful in choosing the spacing between successive tiers.

The purpose of lot blending is, of course, to blend successive lots of material together so as to yield as uniform a mixture as possible. Accordingly, the quantity of material drawn from each lot in the blending zone should remain as constant as possible. Since the amount of material withdrawn through the ports of the first tier is reduced for spike blending, however, it may be desirable to additionally constrain the spacing of the ports such that each lot spans more than a single tier. In the bin referred to in connection with Table I, the ports and tiers were spaced such that a lot of material spanned six ports. Thus, the distance between ports and tiers may advantageously be chosen such that a single lot spans more than a single tier. In the example bin discussed in connection with Table I, the spacing of ports and tiers was chosen such that a lot of material spanned six ports. Thus, when the four ports of the first tier and first two ports of the second tier are drawing material from a lot, material from such lot comprised 18% of the outlet stream. This percentage increases gradually as the lot moves downward in the bin until it reaches its maximum of 33.3% when material is being withdrawn from the lot by the four ports of third tier and first two ports of the fourth tier.

Of course, the distance between tiers can be greater than this value and lot blending and spike blending will still be achieved. The lot blending will, however, differ from the preceeding example in that the amount withdrawn from each lot will fluctuate rather than rising smoothly to a predetermined level and then tapering off.

It should be noted that the interface between lots is in many ways similar to a spike. Particularly in the milling industry, different carloads or truckloads of grain may have different moisture and protein contents. Accordingly, by simultaneously accomplishing spike blending and lot blending, the transition between lots does not result in major fluctuations of the moisture and protein concentration in the outlet stream as successive lots enter and continue through the blending zone.

The present invention may be used in the construction of new bins and silos or may be economically used in existing facilities. Since only a small number of passageways need be used compared to the total number of ports, they may be installed inside the bin with minimal sacrifice of cubic capacity and minimal obstruction of flow of material. The cost of the installation is also lowered by the use of multiple ports in each passageway.

Although the invention has been described herein with respect to a preferred embodiment, it will be apparent to those skilled in the art that numerous modifications may be made thereto within the scope of the invention.

What is claimed is:

1. A method for blending particulate material contained within an enclosure of substantially uniform cross-section defining a vertically extending zone comprising the steps of:

removing material from the bottom of said enclosure to establish substantially laminar mass flow in said zone;

simultaneously withdrawing material from a plurality of vertically spaced locations within said zone in a flow passageway through openings in said passageway, dividing the passageway adjacent to each opening into two separate non-communicating flow channels, one of said flow channels communicating with the flow of material from higher locations in said passageway and the other of said flow channels communicating with the associated opening, and extending said flow channels in substantially uniform cross-section a sufficient distance below the associated opening to eliminate particle-to-particle turbulence therein so as to create laminar mass flow of the material at the exit of each said flow channel;

combining the material withdrawn at any given location with material withdrawn from higher locations in said passageway in predetermined proportion in laminar mass flow therewith in said passageway, whereby material enters said opening in proportion in the relative flow channel cross-sectional area at the exit end thereof and combines with material from higher locations in proportion to the relative cross-sectional areas of said flow channels; and combining the material withdrawn from said zone in said passageway in predetermined proportion with material withdrawn from the bottom of said enclosure so as to effect blending of the material withdrawn.

2. The method of claim 1 further comprising the step of withdrawing material in a plurality of said passageways and combining the flow in said passageways in predetermined proportion with material withdrawn from the bottom of said enclosures so as to effect blending of the material withdrawn in to a single stream.

3. The method of claim 1 including the step of controlling the amount of material withdrawn at said locations such that a lesser amount is withdrawn at an upper location than is withdrawn at a lower location.

4. The method of claim 1 wherein said locations are vertically spaced such that the concentration of material withdrawn from a thin layer of material does not exceed a predetermined proportion in any portion of said stream.

5. A blending apparatus for blending particulate material contained within a bin comprising:

means for removing material from the bottom of said bin and establishing mass flow of material in said bin, means providing a separate flow passageway having a plurality of ports positioned at vertically spaced locations for simultaneously withdrawing material from said bin at said plurality of vertically spaced locations, means operatively associated with each such location and dividing the flow passageway along its length adjacent the associated port to provide one cross-sectional area for receiving material from the associated port and a second cross-sectional area for receiving material from ports at higher elevations associated with said passageway, the passageway being configured such that the particulate material moves in laminar mass flow below the dividing means for controlling the proportion of material withdrawn at each such location relative to material withdrawn from higher locations and combining the withdrawn material into a single stream, and means for combining the material in said flow passageway in predetermined proportion with material withdrawn from the bottom of said bin so as to blend the material withdrawn.

6. The blending apparatus of claim 5 including a plurality of said flow passageways in spaced relationship, the ports in adjacent passageways being vertically spaced defining a region with said regions being tiered vertically within said bin.

7. The apparatus of claim 6 wherein the thickness of each such region decreases from the uppermost region to the lowermost region in relation to the amount of material withdrawn at locations above such region.

8. The apparatus of claim 5 further comprising means connected to the dividing means for adjusting the relative dimensions of said two cross sectional areas whereby the proportion of material flowing through said areas is controlled.

9. The apparatus of claim 5 wherein the vertical spacing between said locations is chosen such that the concentration of material withdrawn from a thin layer of material does not exceed a predetermined proportion in any portion of said flow passageway.

10. The apparatus of claim 5 wherein the amount of material withdrawn is controlled such that a lesser amount is withdrawn at higher locations than is withdrawn at lower locations.

11. The apparatus of claim 5 wherein said means for combining the material in said flow passageway and the material from the bottom of said bin comprises means for combining said materials in laminar mass gravity flow in said predetermined proportions.

12. A method for introducing a first particulate material into a closed vertical passageway having a second particulate material moving downwardly therethrough in laminar mass flow comprising the steps of;

dividing the passageway adjacent to an opening in the passageway into two separate non-communicating flow channels, one of said flow channels communicating with the flow path of said second particulate material and the other of said flow channels communicating with said opening, and extending said flow channels in substantially uniform cross section a sufficient distance below said opening to eliminate particle-to-particle turbulence therein so as to create laminar mass flow of the material at the exit of each said flow channel, whereby said first material enters said opening in proportion to the relative flow channel cross-sectional area at the exit end thereof and combines with said second material in proportion to the relative cross-sectional areas of said flow channels.

13. The method of claim 12 wherein said flow channels are defined by an adjustable blending vane and including the step of controlling the relative cross-sectional areas of said flow channels by adjustment of the position of said blending vane.

* * * * *

UNITED STATES PATENT AND TRADEMARK OFFICE
CERTIFICATE OF CORRECTION

PATENT NO.   : 4,560,285
DATED        : Dec. 24, 1985
INVENTOR(S)  : Glen W. Fisher It is certified that error appears in the above-identified patent and that said Letters Patent is hereby corrected as shown below:

Column 7, line 51, "terminals" should read --terminates--.

Signed and Sealed this

Sixth Day of May 1986

[SEAL]

Attest:

DONALD J. QUIGG

Attesting Officer

Commissioner of Patents and Trademarks